United States Patent [19]

Rietdijk et al.

[11] Patent Number: 5,032,443

[45] Date of Patent: Jul. 16, 1991

[54] METHOD OF MAKING AN ARTICLE FROM A THERMOPLASTIC SANDWICH MATERIAL

[75] Inventors: Bartjan Rietdijk, Pijnacker; Johan A. Brambach, Leimuiden, both of Netherlands

[73] Assignee: Schreiner Luchtvaart Groep B.V., Leiden, Netherlands

[21] Appl. No.: 616,930

[22] Filed: Nov. 21, 1990

[30] Foreign Application Priority Data

Nov. 23, 1989 [NL] Netherlands ........................ 8902899

[51] Int. Cl.$^5$ .............................................. B32B 3/04
[52] U.S. Cl. .................... 428/121; 156/227; 264/321; 428/122
[58] Field of Search ........................ 156/227; 264/321; 428/121, 122

[56] References Cited

U.S. PATENT DOCUMENTS

| 3,222,437 | 12/1965 | Schilling | 264/54 |
| 3,649,398 | 3/1972 | Keith | 428/122 |
| 3,687,170 | 8/1972 | Malone et al. | 138/143 |

FOREIGN PATENT DOCUMENTS

| 0269148 | 6/1988 | European Pat. Off. |
| 2425564 | 12/1974 | Fed. Rep. of Germany |
| 1260187 | 3/1961 | France |
| 2196902 | 3/1974 | France |

OTHER PUBLICATIONS

Composites, vol. 28, No. 2, Mar./Apr. 1988, (French), "Aspect Economique des Thermoplastiques Renforces de Fibres".

Japanese Patent Abstract, vol. 9, No. 162, Jul. 6, 1985, "Manufacture of Corrugated Cardboard Fold-Molding Material ...".

Japanese Patent Abstract, vol. 13, No. 385, Aug. 26, 1989, "Scribing Blade for Thin Plastic Sheet".

Primary Examiner—William J. Van Balen
Attorney, Agent, or Firm—Burns, Doane, Swecker & Mathis

[57] ABSTRACT

This invention relates to a method of making an article from a thermoplastic sandwich material, the normals of at least two surfaces of said material mutually forming an angle, said sandwich material comprising a foam core of a thermoplastic foam and top layers of a thermoplastic synthetic material, which top layers are reinforced with woven fabric, knitted fabric, fibre web or unidirectionally applied fibres, comprising at least the steps of softening a portion of one of said surfaces of said thermoplastic sandwich material over a distance corresponding at least to the length of the folding line of the angle between the two surfaces, by means of a die, the impression of said die being provided at least partly in the top layer, and folding the two surfaces of said thermoplastic material, the surface that has been softened being thereby disposed on the inside of the angle.

14 Claims, 1 Drawing Sheet

METHOD OF MAKING AN ARTICLE FROM A THERMOPLASTIC SANDWICH MATERIAL

BACKGROUND OF THE INVENTION

This invention relates to a method of making an article from a thermoplastic sandwich material, the normals of at least two surfaces of said material mutually forming an angle, said sandwich material comprising a foam core of a thermoplastic foam, and top layers of a thermoplastic synthetic material, which top layers are reinforced with woven fabric, knitted fabric, fibre web or unidirectionally applied fibres.

Sheet-form materials, such as sandwich constructions, are widely used in those areas where materials are used which must combine a great strength or stiffness with a light weight. Examples are applications in aircraft, spacecraft, and transportation, such as maritime and automobile applications.

Sandwich constructions generally consist of a core material which is light in weight, with a mostly reinforced top layer applied to surfaces thereof. By proper bonding between the top layers and the core material the proper stiffness is obtained. The other properties of the material are partly determined by the nature of the various materials.

Known sandwich constructions are based on a core material with a honeycomb structure. Another type of sandwich material is described in European patent applications 264 495 and 269 148. That material is entirely thermoplastic and consists of a core material which contains inter alia a thermoplastic foam and two top layers which consist of a fibre reinforced synthetic material such as polycarbonate or polyetherimide.

European patent application No 88202345.0 discloses a flame-retardant sheet-form material which is also thermoplastic.

In the application of such materials for the construction of articles, such as parts of the interior of aeroplanes, helicopters and the like, it is advantageous when the material can be deformed through the application of heat. European patent application 269,148, mentioned above, discloses a method which makes it possible to obtain two- and three-dimensional deformations of thermoplastic sheet materials consisting of a foam core and reinforced top layers, without any loss of mechanical properties. However, there is also a need for a method of folding such sheet material at an angle, with the mechanical properties being preserved and there being no need of carrying out complex material-removing operations.

SUMMARY OF THE INVENTION

This invention provides such a method for making an article from a thermoplastic sandwich material, the normals of at least two surfaces of said material exhibiting an angle relative to each other which sandwich material consists at least of a foam core of a thermoplastic foam, and top layers of a thermoplastic synthetic material, said top layers being reinforced with woven fabric, knitted fabric, fibre web or unidirectionally applied fibres, said method comprising at least the steps of softening a portion of one of said surfaces of said thermoplastic sandwich material over a length corresponding at least to the length of the folding line of the angle between the two surfaces by means of a die, the impression of said die being provided at least partly in the top layer, and folding the two surfaces of said thermoplastic material, the surface that has been softened being thereby disposed on the inside of the angle.

Indeed, thus a material is obtained which is folded in a manner in which the excess material of the top layer present on the inside of the angle is molten into the foam of the core. By the heat applied, this material fuses with the core. As a result, the fold has the same strength as the original material. It is observed that in normal folding methods the excess material will bulge out, so that a proper fold is not obtained. Moreover, in the method according to the invention, during the folding a mutual bonding of the top layers will occur due to the hinging action and the counter pressure of the foam. Partly owing to this, the top layers are very firmly anchored in the angles, which is evidenced by the fact that the foam strength at that location determines the tearing strength.

The sheet-form material to be folded (sandwich construction) preferably consists of a thermoplastic, foam-like core material and two top layers, which consist of a thermoplastic synthetic material which has been reinforced with a woven fabric, a knitted fabric, a fibre web or unidirectionally applied fibres. Such a material is described inter alia in the European patent applications mentioned in the introduction.

The materials from which the sheet-form material may be constructed are also described in the European patent application mentioned. More particularly the thermoplastic foam-like core material is a polyetherimide foam, a polycarbonate foam, a polymethacrylamide foam, a polyether sulfone foam, a polyether ketone foam, a polyether-ether ketone foam, or a polyphenylene sulfide foam.

The top layers preferably consist of fibre reinforced synthetic material, more particularly of a thermoplastic synthetic material which has been reinforced with a fabric, a knitted fabric, a fibre web or unidirectionally applied fibres.

The thermoplastic synthetic material, the matrix material of the top layers, is generally a synthetic material with a high softening point, for instance polycarbonate, polyetherimide, polyamide, polysulfone, polyether sulfone, polyether ketone, polyether-ether ketone or polyphenylene sulfide.

The thermoplastic foam-like core material is preferably a polyetherimide foam, a polycarbonate foam, a polymethacrylamide foam, a polyether sulfone foam, a polyether ketone foam, a polyether-ether ketone foam, a polyether ketone-ketone foam, a polyphenylene sulfide foam, or a foam based on a mixture of these synthetic materials. Optionally, fibres can be provided in the foam material. Such fibres can be selected from the group consisting of glass fibres, polyamide fibres, such as aramide fibres, polyethylene fibres, polyester fibres and carbon fibres.

Using said foam materials in combination with the thermoplastic synthetic materials to be mentioned hereinafter for the top layer and the reinforcement yields an optimum construction of the reinforcement and a maximum strength of the total construction and of the points of reinforcement.

Preferably the following thermoplastic synthetic materials are used: polyetherimide, polycarbonate, acrylate polymers, styrene polymers, polyether sulfone, polyether ketone, polyether-ether ketone, polyether ketone-ketone, polyphenylene oxide, polyphenylene sulfide and mixtures of two or more of these synthetic materials.

In the top layer these synthetic materials are preferably reinforced with glass fibres, polyamide fibres, such as aramide fibres, polyethylene fibres, polyester fibres and carbon fibres.

The sandwich materials to be used are preferably made by bonding together the various layers by applying heat and pressure.

Surprisingly, in the method according to the invention an advantage presents itself in that it is possible to obtain an entirely predictable angular construction by the pre-treatment of the sheet-form material, which angular construction is as strong as the basic material. Indeed, it has been found that due to the softening on one side, a kind of programming of the folding behaviour occurs, so that a predictable and reproducible fold-/angle is obtained. For thin materials, in most applications, a die will suffice whose bottom is round or elliptic in part section, or exhibits one angle. When thicker materials are used, such a die is generally not satisfactory, since too much material would have to be molten away. In this case the die preferably has at least two angles in section.

The magnitude of the angle depends on the materials to be used and the nature of the angular construction. Relatively acute angles have the advantage that they give better reproducibility. Accordingly, values for the angle may vary within very wide limits, i.e. from about 15° to 175°.

In carrying out the method, one will aim for the circumference of the die, i.e. the portion that is pressed into the top layer of the sandwich material, to substantially correspond to $\phi r$, wherein $\phi$ is the angle in radians which the normals of the two surfaces make with each other and r is the thickness of the sandwich material. In such a case an optimum angular construction is obtained without undue deformation of the sandwich material occurring.

When a die is used which has two or more angles in section, preferably the lateral faces of the die are conical, so that a ready release of the die from the sandwich material is obtained. More particularly, at the underside of the die at least two faces are present which make an angle with each other and with the lateral faces.

In the method according to the invention at least a portion of one of the surfaces of the sandwich material is softened. This will generally be effected through the application of heat. A suitable manner is using a hot die, so that a softening will occur fast. Naturally, other methods are also possible, but they are not preferred. Optionally, heating the surface can be combined with a softening through the use of a solvent or softener for the matrix material of the top layer. A suitable agent for that purpose is dichloromethane.

Optionally, local softening of a portion of the top layer of the sandwich material can be combined with heating the entire sheet or a large part thereof. In particular, it is preferable to additionally heat the sandwich material locally on the corresponding outside of the angle to be formed. This means, therefore, that the sandwich material is heated on the other side relative to the die. Such heating need not be so strong as to cause softening. Optionally, a measure of heating can be applied on the side of the die as well, although this does not offer any specific advantages. In general, care must be taken that the degree of heating is not such that softening will also occur outside the areas to be softened, because this might detract from the reproducibility of the fold/angle.

As already indicated, softening of the surface is effected by heating the surface, optionally in combination with the use of a softener. The temperature used is such that the matrix material of the top layer becomes soft. However, the temperature and duration of the heating should be so selected as to avoid too much of the foam core from melting. Accordingly, the temperature to be selected entirely depends on the material used and can be determined by means of routine experiments.

The thickness of the sandwich material influences inter alia the form of the die. This thickness varies between wide limits. In practice, approximately 2.5 mm is a lower limit, while 10 cm, more particularly 2.5 cm is an upper limit.

In general, the sandwich material will already deform slightly (begin to fold) during the softening and providing of the impression of the die, because tensile forces are exerted on the fibres by impressing the die. Simultaneously with, or subsequently to, heating, the two surfaces of the sandwich material are moved towards each other to form an angular construction. This can be done by hand, but, naturally, it is preferable to do this by means of a suitable bending bench or comparable apparatus.

BRIEF DESCRIPTION OF THE DRAWINGS

The invention will now be explained and illustrated with reference to the accompanying drawings in which

FIG. 1(a) illustrates one of the simplest embodiments, in which the sides of the die are vertical. The die of FIG. 1(b), by virtue of its conical sides, lends itself better for use with materials which might present releasing problems. The die shown in FIG. 1(c) can be used for simple thin materials. The dies illustrated in FIGS. 1(d) and 1(e), by contrast, are more suitable for thicker materials that are more difficult to fold and where more material will be present in the fold. The die of FIG. 1(f) is a simple embodiment, which would mainly be used in very thin materials that are easy to process.

The invention will now be explained with reference to an example, which is not intended to limit the invention.

EXAMPLE

Figure 1A:
FIGS. 1(a) through 1(f) illustrate various forms of dies, while FIGS. 2(a) and 2(b) schematically illustrate the principle of the invention.
Figure 1B:
Figure 1C:
Figure 1D:
Figure 1E:
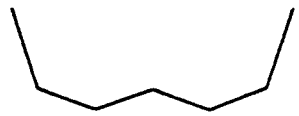
Figure 1F:
Figure 2A:
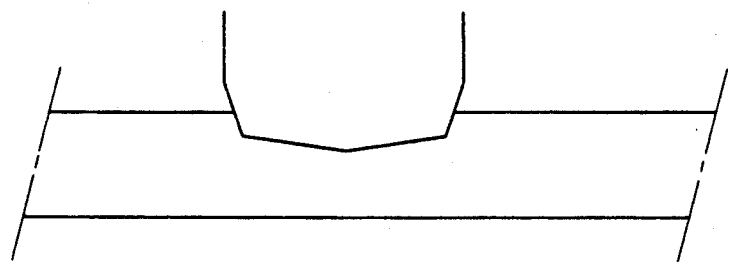
FIG. 2(a) shows at the top that a die is impressed in the softened portion of the surface, after which an angular construction is formed by folding the two surfaces towards each other. As can be seen in FIG. 2(b), the folding of the material is pre-programmed by the angles of the die, so that a well defined angular construction is formed.
Figure 2B:
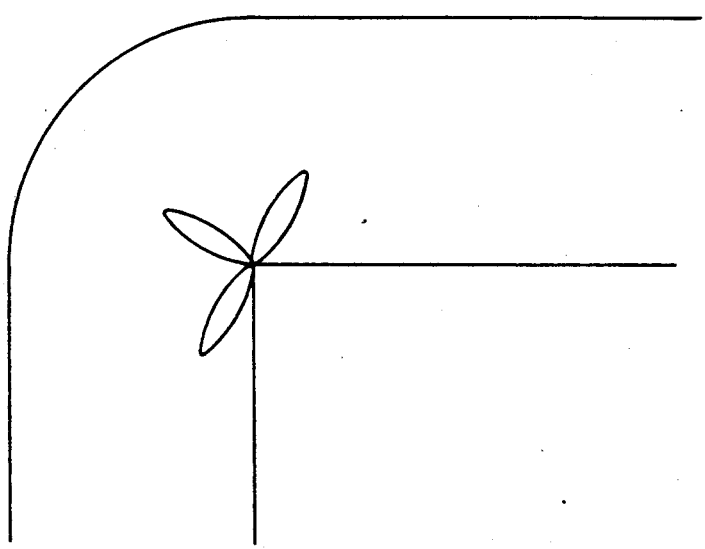

A panel of a sandwich material of a size of 10×10 cm, consisting of a 10 mm thick core of polyetherimide and two top layers of polyetherimide which has been reinforced with a glass fabric, was locally heated to 320° C. by means of a die of a shape corresponding to FIG. 1d. The three angles were 175°, while the circumference of the die impression was 18.2 mm in the material.

With a force of 0.750 kg/cm$^2$ the die was pressed into the panel, after which the two surfaces were folded to form an angle of 110° by a force of 1 kg/(cm panel width). After cooling the panel was subjected to a strength test by moving the two surfaces apart with a tensile force of 25 kg. The angular construction was retained, but the material finally gave way on the side turned outwards. The bonding in the angular construction is therefore optimal, since the strength of the panel at the location of the angular construction corresponds to the intrinsic strength of the sandwich material.

We claim:

1. A method of making an article from a thermoplastic sandwich material, the normals of at least two surfaces of said material mutually forming an angle, said sandwich material comprising a foam core of a thermoplastic foam and top layers of a thermoplastic synthetic material, which top layers are reinforced with woven fabric, knitted fabric, fibre web or unidirectionally applied fibres, comprising at least the steps of softening a portion of one of said surfaces of said thermoplastic sandwich material over a distance corresponding at least to the length of the folding line of the angle between the two surfaces, by means of a die, the impression of said die being provided at least partly in the top layer, and folding the two surfaces of said thermoplastic material, the surface that has been softened being thereby disposed on the inside of the angle.

2. A method according to claim 1, wherein the die in cross-section has at least one, preferably at least two angles.

3. A method according to claim 1, wherein the circumference of the die is equal or substantially equal to $\phi r$, wherein $\phi$ is the angle in radians, mutually formed by the two surfaces and r is the thickness of the sandwich material.

4. A method according to claim 1, wherein the sandwich material comprises a core of a polyetherimide foam, a polycarbonate foam, a polymethacrylamide foam, a polyether sulfone foam, a polyether ketone foam, a polyether-ether ketone foam, a polyether ketone-ketone foam, a polyphenylene sulfide foam, or a foam based on a mixture of these synthetic materials.

5. A method according to claim 1, wherein the top layer is reinforced with glass fibres, polyamide fibres, such as aramide fibres, polyethylene fibres, polyester fibres and carbon fibres in the form of a woven fabric, a knitted fabric, a fibre web or unidirectionally applied fibres.

6. A method according to claim 5, wherein the top layer is reinforced with a fabric.

7. A method according to claim 6, wherein the length of the fibres in the fabric substantially corresponds to the length of the sandwich material.

8. A method according to claim 1, wherein the thermoplastic foam-like core material also contains fibres.

9. A method according to claim 8, wherein the fibres are selected from the group consisting of glass fibres, polyamide fibres, such as aramide fibres, polyethylene fibres, polyester fibres and carbon fibres.

10. A method according to claim 1, wherein the foam core also contains liquid crystalline materials.

11. A method according to claim 1, wherein the thermoplastic synthetic material of the top layer is selected from the group consisting of polyetherimide, polycarbonate, acrylate polymers, styrene polymers, polyether sulfone, polyether ketone, polyether-ether ketone, polyether ketone-ketone, polyphenylene oxide, polyphenylene sulfide and mixtures of two or more of these synthetic materials.

12. A method according to claim 1, wherein the lateral faces of the die are conical and at the bottom at least two faces are present which make an angle with each other and with the lateral faces.

13. An article produced from a sandwich material comprising a thermoplastic foam core and at least one thermoplastic top layer applied over at least a portion of the foam core, the top layer forming a surface and being reinforced with woven fabric, knitted fabric, fiber web or unidirectionally applied fibres, the article having an angular configuration formed by a process comprising the steps of:
  a) contacting the top layer of the sandwich material with a die maintained at a temperature sufficient to cause softening of the surface of the article,
  b) softening at least a portion of the surface of said thermoplastic sandwich material by means of said contact, the softened portion having a length corresponding at least to the length of a folding line of the angle forming said angular configuration and wherein a die impression is provided at least partly in the surface,
  c) folding the sandwich material along the softened portion of the surface, thereby providing said angular configuration, wherein the softened portion is on the inside of the angle and wherein at least a portion of excess top layer material is incorporated at said softened portion into said foam core due to said folding.

14. An article having an angular configuration, produced from a sandwich material comprising a thermoplastic foam core and at least one thermoplastic top layer applied over at least a portion of the foam core, said article having been produced by the process of claim 1.

* * * * *